Figure 3:
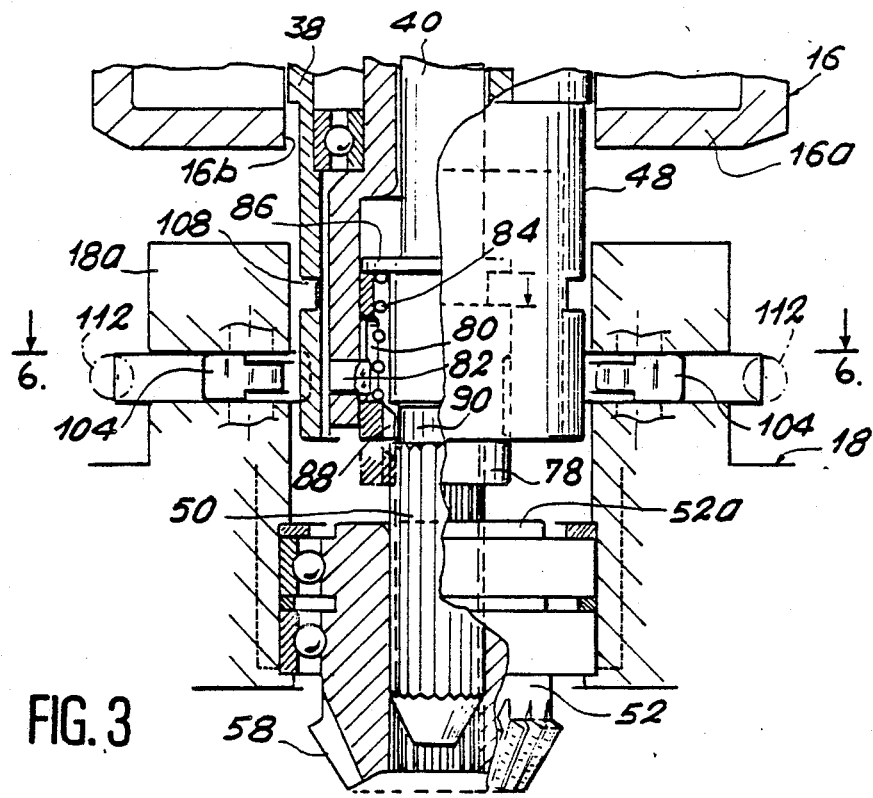

United States Patent [19]

Teillauchet et al.

[11] Patent Number: 4,915,563

[45] Date of Patent: Apr. 10, 1990

[54] AUTOMATIC LOCK FOR MECHANISMS CONTROLLING VARIOUS MOVEMENTS OF THE GRIPPING PLIERS OF A REMOTE HANDLING DEVICE WHEN DISMOUNTING THE BALL AND SOCKET JOINT BEARING THESE PLIERS

[75] Inventors: Eric Teillauchet; Angelo Bandiera, both of Vendome; Laurent Girault, Blois, all of France

[73] Assignee: Societe Nouvelle d'Exploitation La Calhene, Villacoublay, France

[21] Appl. No.: 310,722

[22] PCT Filed: May 19, 1988

[86] PCT No.: PCT/FR88/00253

§ 371 Date: Jan. 9, 1989

§ 102(e) Date: Jan. 9, 1989

[87] PCT Pub. No.: WO88/09247

PCT Pub. Date: Dec. 1, 1988

[30] Foreign Application Priority Data

May 20, 1987 [FR] France ................... 87 07067

[51] Int. Cl.[4] .................................. B25J 15/04
[52] U.S. Cl. ........................... 414/1; 414/7; 74/411.5; 901/29; 901/21; 901/41; 901/49
[58] Field of Search ............... 414/1, 4, 7, 729, 732, 414/723; 901/25, 26, 27, 28, 29, 30, 21, 41, 49; 74/411.5; 188/265

[56] References Cited

U.S. PATENT DOCUMENTS

| | | |
|---|---|---|
| 3,297,172 | 1/1967 | Haaker et al. .................. 414/7 X |
| 3,543,592 | 12/1970 | Haaker et al. .................. 901/29 X |
| 3,543,593 | 12/1970 | Haaker et al. .................. 901/29 X |
| 3,572,807 | 3/1971 | Haaker .......................... 414/7 X |
| 4,650,388 | 3/1987 | Frioux et al. ................... 414/1 |

FOREIGN PATENT DOCUMENTS

| | | |
|---|---|---|
| 0104118 | 9/1983 | European Pat. Off. . |
| 0292384 | 11/1988 | European Pat. Off. ........... 901/28 |
| 1341489 | 12/1973 | United Kingdom ............. 414/1 |

Primary Examiner—Robert J. Spar
Assistant Examiner—William M. Hienz
Attorney, Agent, or Firm—Oblon, Spivak, McClelland, Maier & Neustadt

[57] ABSTRACT

Strips (20), housed in the slave arms (10) of a remote handling device and used for transmitting to the pair of gripping pliers borne by this arm orientation and tightening movements remote controlled by an operator, rotate pinions (26a) mounted at the extremity of the slave arm (10). These pinions (26a) are normally geared onto pinions (30a) mounted in a ball and socket joint (16) inserted between the pliers and the slave arm. When the ball and socket joint is dismounted, any attempt to remove the strips (20) is made impossible by the locking devices (60a) which come to rest onto the flanks of the pinions (26a) under the action of the spring (72). Any breakage of the strips due to their being pulled during dismantling of the ball and socket joint is thus avoided.

8 Claims, 3 Drawing Sheets

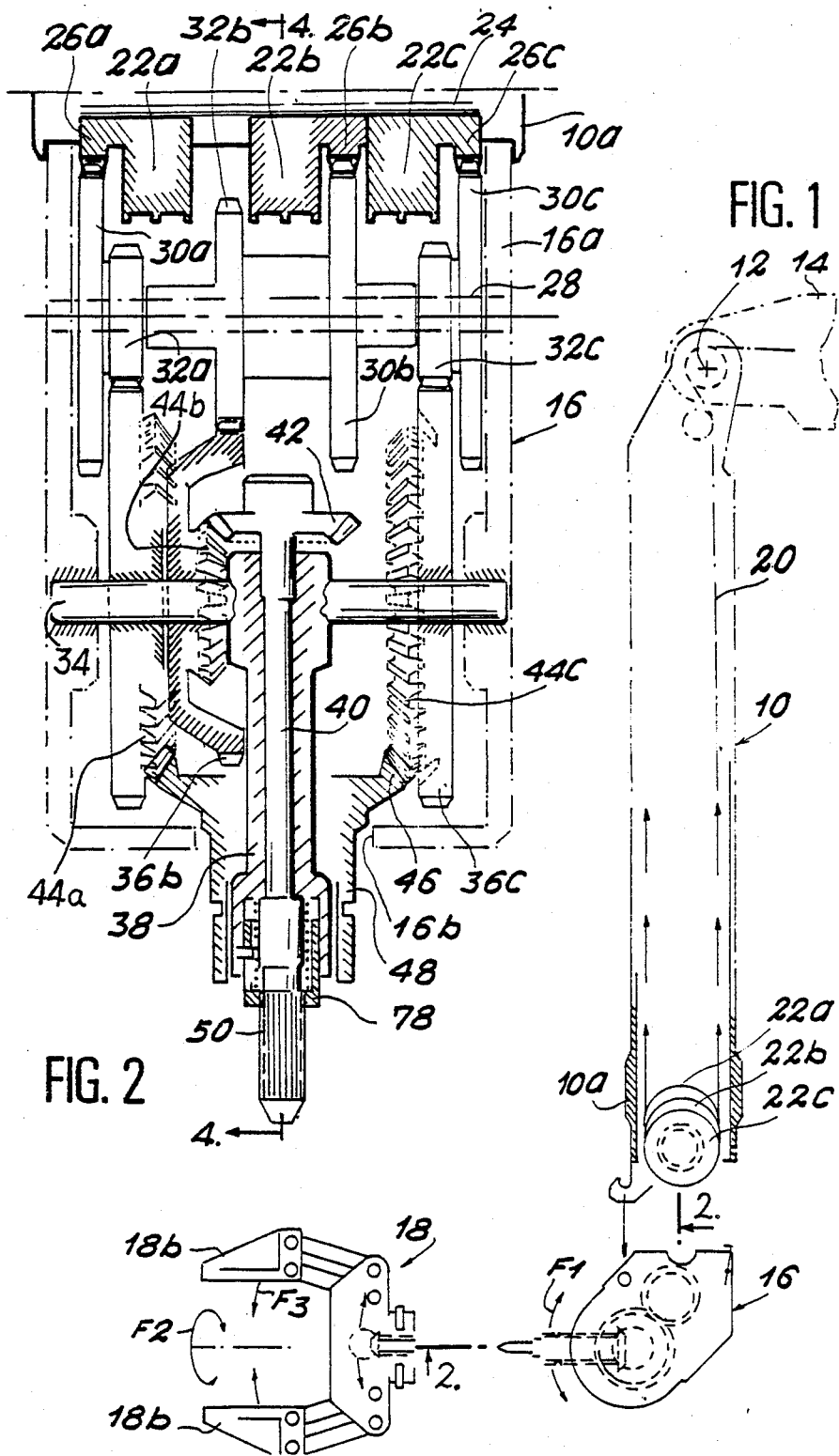

AUTOMATIC LOCK FOR MECHANISMS CONTROLLING VARIOUS MOVEMENTS OF THE GRIPPING PLIERS OF A REMOTE HANDLING DEVICE WHEN DISMOUNTING THE BALL AND SOCKET JOINT BEARING THESE PLIERS

The invention concerns an automatic lock for devices controlling the various movements of a pair of gripping pliers borne by a ball and socket joint secured in a dismountable way at the extremity of one slave arm of the remote handling device during dismounting of the ball and socket. Optionally, this device also ensures automatic locking of the aforesaid mechanisms during dismounting of the gripping pliers when the latter is also dismountable.

Remote handling devices are known to be devices allowing certain handling operations to be effected inside containment cells. Outside the cell, these devices include a master arm and a control handle mounted by a ball and socket joint at the extremity of the master arm. The part of the device situated inside the cell comprises a slave arm completed by a ball and socket joint on which secured is a pair of gripping pliers. These two parts of the remote handling device can be interconnected mechanically or electrically so that the slave arm and the gripping pliers it bears virtually identically reproduce movements carried out by the operator on the master arm and its control handle. According to the type of handling operation to be carried out, the master and slave arms can either be articulated or telescopic.

In general, both the control handle and the gripping pliers possess two degrees of freedom to which added is the clamping movement of the pliers. These two degrees of freedom correspond to a possibility for pivoting of the handle and pliers around an axis orthogonal to the axis of the arm which bears them and to a pivoting movement of the handle and pliers around their own axis.

In order to transmit these various movements along the arm, strips wound up on pulleys and whose extremities are fixed onto capstans are frequently used. In the case where the transmission of movements between the master and slave arms are carried out electrically, the capstans situated at the upper extremity of the slave arm being controlled by motors which are activated when signals representative of a corresponding movement of the master arm are received.

Moreover, in order to facilitate maintenance and enable different operations to be carried out inside a given cell, the unit formed by the gripping pliers and the ball and socket joint bearing the latter is generally fixed in such a way to make it dismountable at the slave arm extremity.

If the operator accidently activates the control handle when the gripping pliers and its ball and socket joint are disconnected, the motors controlling the drive capstans of the strips housed in the slave arm are activated, which provokes the winding and unwinding of the strips over a certain length. When the pliers and the ball and socket joint are reset, the strips then occupy a position different from the one they occupied before these devices were removed. Given the fact that the strips housed in the slave arms frequently have a limited additional travel with respect to the travel they must normally have in order to ensure the control of the pliers movements, it is then possible that one of the strips reaches the end of travel before the mechanical stop, provided to this effect on the pliers or the ball and socket joint, is activated.

in these conditions, it frequently occurs that the movement transmission strips housed in the slave arm may break. Such an incident may prove too be serious since it results in immobilization of the remote handling device and involves a long and costly intervention.

Should the risk explained above be particularly great when the transmission of movements between the master arm and the slave arm is carried out electrically, since the motors continue to move when the strips are reaching the end of stroke, this also occurs when this transmission of movements is carried out mechanically, since the reaction of the operator may in some cases be carried out tool late.

The specific aim of this invention is to produce a device enabling this drawback to be overcome by ensuring automatic locking of the mechanisms controlling the movements of the pliers as soon as the ball and socket joint is disconnected.

More precisely, the present invention proposes a self-locking mechanism controlling different movements of a pair of gripping pliers borne by a ball and socket joint fixed so as to be dismountable at one extremity of the slave arm of the remote handling device when the ball and socket joint is being dismounted, these mechanisms including a first series of pinions housed in the extremity of the slave arm and a second series of pinions mounted in the ball and socket joint so as to be geared onto the pinions of the first series when the ball and socket joint is secured to the extremity of the slave arm, this device being characterized in that it includes mobile locking members housed in the extremity of the slave arm, elastic means tending to apply these blocking members against the pinions of the first series, and at least one stop integral with the blocking members so as to disengage the latter from the first series under the effect of the coming to rest of this stop against an opposite surface formed on the ball and socket joint when the latter is secured to the extremity of the slave arm.

By means of such a device, it is no longer possible via an unexpected manoeuvre of the control handle to drive the transmission movement strips housed in the slave arm when the pliers and ball and socket joint supporting it are disconnected. Consequently, no shifting can be created between the strips and the corresponding devices housed in the ball and socket joint and the pliers, so that it is no longer possible for these strips to reach the end of travel before the mechanical devices have come to rest against the stop. Consequently, all risk of breakage of strips due to such a manoeuvre is eliminated.

According to a preferred embodiment of the invention, the automatic locking device includes two series of blocking devices, one blocking device from each series coming to be applied against the opposite flanks of the teeth of each pinion of the first series of pinions under the effect of elastic means so as to stop these pinions rotating when the ball and socket joint is dismounted.

The blocking devices of each series can be secured to a common axis, a stop being secured to each of said axes.

Preferably, the axes bearing the blocking devices of each series are approximately disposed on both sides of the pinions of the first series of pinions, the blocking devices having the shape of ratchet gears oriented towards these pinions and applied against the latter by at least one draw spring inserted between the two series of blocking devices and forming said elastic means.

In the special case where the gripping pliers are secured so that they are dismountable on the ball and socket joint, the mechanical stops of the end of travel concerning the clamping movement of the pliers are removed when the latter is dismounted. The previous problem is therefore limited in this case to the risk of rupture of the strip controlling this clamping movement, if there is ill-timed activation of the handle when the pliers are being dismounted.

In this particular case and according to an improved embodiment of the invention, the aforesaid movement control mechanisms moreover include a revolving shaft for controlling tightening of the pliers housed in a non-rotating tubular part of the ball and socket joint, one part of which projects from this part and is provided with grooves, said part provided with grooves being received into a grooved hole formed inside a control part for tightening the pliers when the latter is secured to the ball and socket joint. Therefore, the locking device moreover includes a ring inserted between the tubular part and the revolving shaft, means for immobilizing the rotating ring in the tubular part and so as to allow for a limited displacement of the ring according to a common axis to the revolving shaft, the tubular part and the ring between a front position in which the ring is geared onto the grooves of said part and a rear position in which the ring is freed from said grooves, elastic means tending to move the ring towards said front position, and an area of support formed on the tightening control part, this area of support maintaining said ring in the rear position when the pliers are secured on the ball and socket joint.

Preferably, the ring has an oblong hole, orientated parallel to said axis, which receives a key immobilizing the rotating ring in the tubular part and allowing for its movement between said front and rear positions.

In a particular embodiment of the invention, the ring includes an interior grooved crown, this crown being geared onto the grooves when it is in its front position when it is housed in an annular groove extending the grooves when the ring is in its rear position.

Figure 6:
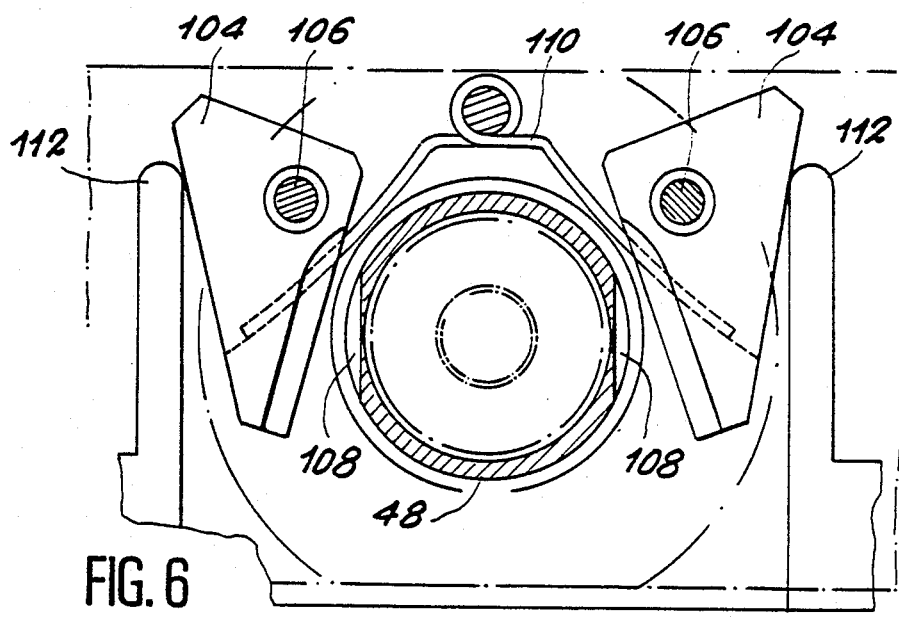
Figure 4:
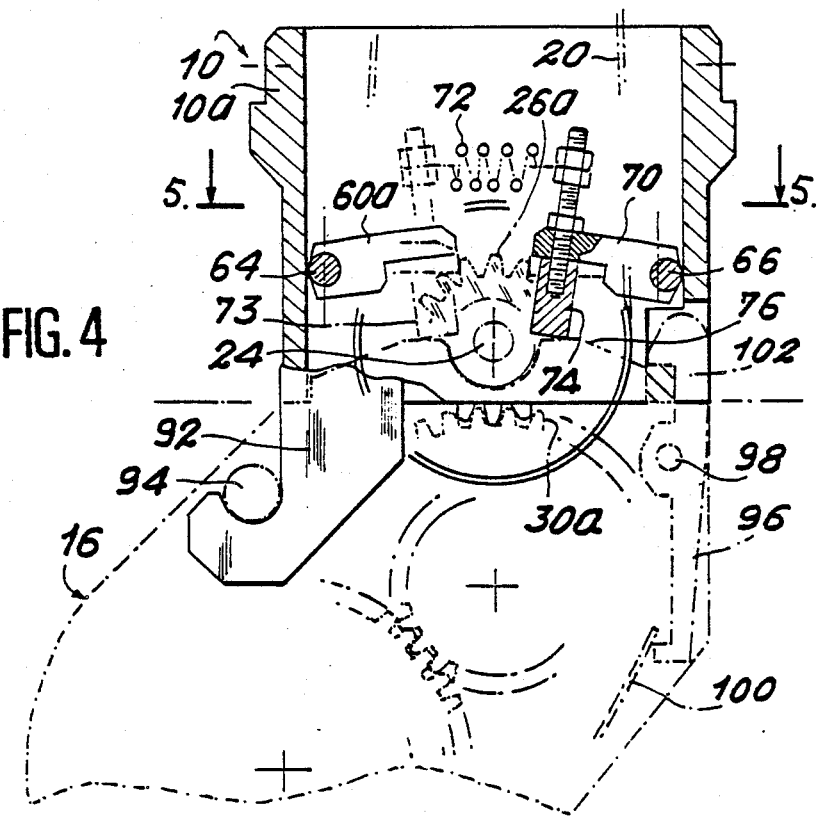
Figure 5:
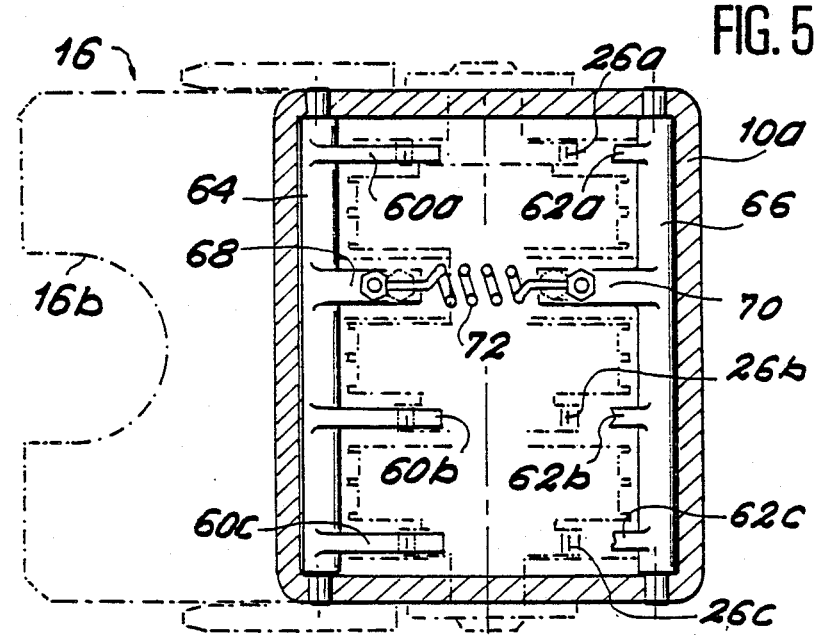

There now follows a preferred embodiment of the invention given by way of example by no means restrictive and with reference to the annexed drawings in which:

FIG. 1 is a side view diagrammatically showing the slave arm of a remote handling device, the dismountable ball and socket joint capable of being secured to the extremity of the dismountable gripping pliers able to be secured to the ball and socket joint, FIG. 2 is a longitudinal cross-sectional view along line II—II of FIG. 1, showing on a larger scale the extremity of the slave arm and the ball and socket joint, FIG. 3 is a longitudinal cross-sectional view showing the contiguous parts of the gripping pliers and the ball and socket joint during connection, FIG. 4 is a sectional view along line IV—IV of FIG. 2, FIG. 5 is a sectional view along line V—V of FIG. 4, and FIG. 6 is a sectional view along line VI—VI of FIG. 3.

FIG. 1 diagrammatically illustrates the front segment 10 of the slave arm of an articulated remote handling device. This front segment 10 is articulated by an elbow axis 12 on a rear segment 14, which is itself articulated by a shoulder axis onto a support block mounted inside a cell (not represented).

Dismountable fixing means make it possible to dismount by remote control operation a ball and socket joint 16 at the free extremity of the slave arm 10. In the example of the illustrated embodiment, a pair of dismountable articulated gripping pliers 18 are also secured to the ball and socket joint 16 by fixing means able to be remote controlled and which shall be described subsequently.

It should also be observed that the dismountable fixing means provided between the slave arm 10 and the ball and socket joint 16 and between the ball and socket joint 16 and the pliers 18 do not form part of the invention and may be embodied in whatever manner with which the mechanic is familiar.

It should also be noted that the invention is not limited to the case where the griping pliers 18 are secured to the dismountable ball and socket joint 16, but are also applicable to the case where such a device cannot be dismounted.

As shall be fully explained subsequently, the ball and socket joint 16 enable the gripping pliers 18 to rotate around an axis orthogonal to the longitudinal axis of the arm 10 (arrow F1 on FIG. 1) and make the pliers 18 rotate around its own axis (arrow F2 on FIG. 1). These two movements are mechanically limited by stops provided on the ball and socket joint 16.

Moreover, the gripping pliers 18 are provided with a clamping movement (arrow F3 on FIG. 1) which is mechanically limited by the stops situated inside the pliers.

As clearly illustrated diagramatically on FIG. 1, the transmission inside the slave arm 10 of control signals of each of the three movements F1, F2 and F3 are carried by means of strips 20, whose extremities are situated inside the support block, are secured to the capstans (not illustrated) controlled by motors sensitive to signals coming from the master arm.

At the free extremity of the slave arm 10, each of the strips 20 winds onto the pulley. More precisely, when three movements are transmitted to the pliers, three pairs of strips 20 are housed inside the slave arm, each of these pairs of strips 20 ensuring the transmission of one of these movements. Each pair of strips 20 is wound onto the upper extremity of the slave arm on a double pulley 22a, 22b, and 22c respectively. More precisely, the extremities of two strips 20 of a given pair are secured to the two pulleys of one of the double pulleys and are wound in the opposite direction on these pulleys so as to transmit the corresponding movement in the two opposite directions.

As shown in more detail on FIG. 2, the three pulleys 22a, 22b and 22c are mounted so as to allow them to rotate freely on an axis 24 traversing the body 10a of the arm 10 situated perpendicular to its own axis.

Each of the pulleys 22a, 22b and 22c is rendered integral with one pinion 26a, 26b and 26c respectively. In the example shown, these pinions all have the same diameter.

There now follows a description with reference made to FIGS. 2 and 3 of the means allowing for the movements of the pliers to be transmitted to the pulleys 22a to 22c.

As shown on FIG. 2, the ball and socket joint 16 consists of a box 16a inside which fixed is a spindle 28 disposed parallel to the axis 24 when the ball and socket joint is secured to the extremity of the slave arm. The spindle 28 rotation supports three identical pinions 30a, 30b and 30c which are respectively geared onto the pinions 26a, 26b and 26c when the ball and socket joint is secured to the arm.

Each of the pinions 30a, 30b and 30c are integral with a second pinion 32a, 32b and 32c.

The ball and socket joint box 16a also supports in rotation a second spindle 34 fixed parallell to the spindle 28. This spindle 34 rotation receives three spindles 36a, 36b and 36c which are geared onto the pinions 32a, 32b and 32c.

A tubular part 38 is secured to the centre of the spindle 34 in such a way that its axis is perpendicular to the spindle 34. This tubular part 38 projects through an circle arc shaped aperture 16b formed inside the ball and socket joint box 16a and it bears in rotation a shaft 40.

At its extremity situated inside the box of the ball and socket joint, the shaft 40 supports an angular wheel 44b integral with the pinion 36b.

Moreover, the pinions 36a and 36c are identical and arranged symmetrically on both sides of the axis common to the shaft 40 and the tubular part 38. In addition, these pinions are integral respectively with an angular wheel 44a and an angular wheel 44c, these two angular wheels being identical and facing each other. The angular wheels 44a and 44c are geared onto an angular wheel 46 integral with a tubular joining piece mounted to rotate on the tubular part 38.

The shaft 40, the tubular part 38 and the tubular joining piece 48 are disposed coaxially and all three have a part projecting outside the box 16a of the ball and socket joint through a circle-arc shaped aperture 16b.

Moreover, the rotating shaft 40 comprises outside the box 16a a part provided with grooves 50, this part being situated projecting with respect to the extemities of the part 38 and the joining piece 48.

As shown in particular on FIG. 3, these three different parts projecting from the shaft 40, the part 38 and the joining piece 48 enable the gripping pliers 18 to be secured in a dismountable way on the ball and joint socket 16.

To this end, FIG. 3 shows the pliers 18 include a body whose single tubular portion 18a comes and overlaps the tubular joining piece 48 of the ball and socket joint 18a. Inside this tubular part 18a and stnading back with respect to the extremity of this portion, the body of the gripping pliers supports in rotation a ring-shaped part 52 used to control tightening of the pliers. This part 52 is traversed by a bore in which formed are grooves 56 additional to the grooves 50 formed at the extremity of the revolving shaft 40. Thus, when the tubular portion 18a of the pliers body comes to overlap the joining piece 48 of the ball and socket joint, the grooves 50 are engaged with the grooves 56.

At its extremity situated inside the pliers body, the part 52 is provided with a slanting toothing 58 cooperating in a known way with a pinion system controlling the coming together of the jaws 18b (FIG. 1) of the pliers when a gripping movement F3 is required.

When the pliers 18 are connected to the ball and socket joint 16 and the latter is connected to the extremity of the arm 10, the orientation F1 and F2 and tightening F3 movements of the pliers 18 are transmitted from the strips 20 to the ball and socket joint and pliers by means of the devices recently described as follows:

When the strips 20 wound onto the pulleys 22a and 22c are simultaneously activated in the same direction and at the same speed, the angular wheels 44a and 44c are themselves driven in rotation in the same direction and at the same speed by means of the kinematic chains formed respectively firstly by the pinions 26a, 30a, 32a and 36a and secondly, by the pinions 26c, 30c, 32c and 36c. Given the fact that these angular wheels 44a and 44c are geared on the angular wheel 46 at two points diametrically opposed to the latter, the angular wheel 46 does not rotate around its own axis, but the unit formed by the shaft 40, the part 38 and the joining piece 48, as well as by the pliers borne by this unit, is driven in rotation around the spindle 34. Therefore, the movement F shown on FIG. 1 is obtained.

On the other hand, when the strips 20 passing onto the pulleys 22a and 22c are driven in the opposite direction and at the same speed, the previously mentioned kinetic chains of pinions lead to a rotation movement in the opposite direction and at the same speed of the angular wheels 44a and 44c. In this case, the angular wheel 46 is made to rotate around its own axis, the same applying also to the joining piece 48 which is integral with it and equally to the pliers 18 mounted on this joining piece. The pivoting movement of the pliers 18 around its own axis, denoted by F2 on FIG. 1, is thus obtained.

Finally, when the strip 20 wound onto the central pulley 22b moves, this pulley drives in rotation the angular wheel 44b by means of the kinetic chain formed by the pinions 26b, 30b, 32b and 36b. With this last pinion being geared on the pinion 42 integral with the shaft 40, the latter is thus driven in rotation around its own axis. Given the fact that the grooves 56 of the ring 52 are engaged with the grooves 50 of the shaft 40, the tightening movement F3 of the pliers is thus obtained.

Of course in practice, these various movements can take place simultaneously.

In the kinematic chain of pinions and housed in the ball and socket joint 16 (FIG. 4), a reduction effect is obtained between the movements of the strips 20 and the movements effectively created on the pliers 18. The localisation of reduction gears inside the ball and socket joint 16 enables the reduction gears, which are generally housed inside the gripping pliers, to be suppressed. Mechanical behaviour is therefore improved since the available space required inside the ball and socket joint is appreciable larger than that available inside the pliers.

In a slave arm of the remote handling device, such as the one previously described, the orientation movements F1 and F2 of the pliers are limited by the mechanical stops (not shown) directly formed on the ball and socket joint 16 and the tightening movement F3 of the pliers is limited by a mechanical stop formed inside the gripping pliers 18. In normal operating conditions, when the control of one of these three movements brings the corresponding devices into contact against these mechanical stops, the strips 20 housed inside the slave arm still possess a certain safety travel. The response time of the motors controlling the various movements on the slave arm can thus merely result in these motors slipping when the devices it controls come and stop abruptly.

On the other hand, if the unit formed by the ball and socket joint 16 and the pliers 18 is disconnected from the arm 10, in the absence of a special provision, an operator could unexpectedly risk activating the control handle of the remote handling device. The motors controlling the strips are then activated and carry out a sometimes long winding and unwinding of the corresponding strips on their capstans. If this unexpectedly controlled movement of the strips 20 is greater than the safety travel with which these strips are usually provided, these strips will then reach the end of travel before the mechanical devices of the ball and socket joint and the pliers when the latter are mounted again onto the arm. Having regard to the response time of the motors, the corresponding strips 20 are then subjected to significant stresses which frequently result in their breakage.

In accordance to the invention, this risk is fully eliminated by means of a device allowing for self locking of the pinions 26a, 26b and 26c mounted at the extremity of the slave arm 10 when the ball and socket joint 16 is disconnected.

As more specifically shown on FIGS. 4 and 5, this device includes two series of three blocking devices, the blocking devices of each series being denoted respectively by the references 60a, 60b and 60c and by the references 62a, 62b and 62c. Each blocking device has roughly the shape of a ratchet gear.

The three locking devices 60a, 60b and 60c are secured to a common axis 64 mounted and pivoting inside the box 10a parallel to the axis 24. The three blocking devices 62a, 62b and 62c are also secured to a common axis 66 mounted in the box 10a parallel to the axis 24 bearing the pulleys 22a, 22b and 22c and the pinions integral with them.

More precisely, the spindles 64 and 66 are situated inside a given plane perpendicular to the longitudinal axis of the slave arm and slightly offset towards the interior of this arm with respect to the axis 24. Moreover, these spindles 64 and 66 symmetrically disposed with respect to a plane containing the longitudinal axis of both the slave arm and the axis 22.

Firstly, the blocking devices 60a, 60b and 60c and secondly the blocking devices 62a, 62b and 62c are placed opposite the pinions 26a, 26b and 26c respectively.

Moreover, as clearly shown on FIG. 4, these blocking devices have lengths enabling their extremity to come to take support on one flank of a tooth of the corresponding pinion. More precisely, the devices 60a, 60b and 60c may come and take support on one flank of one of the teeth of the corresponding pinion to stop rotation in a first direction when the devices 62a, 62b and 62c may come and take support on an opposite flank of another tooth of this pinion so as to stop rotation in the opposite direction. In addition, when one of the blocking device of one of the series blocks rotation of the pinion corresponding to it in a given direction, the two other blocking devices of the same series also block rotation in this same direction of the pinions corresponding to them.

A catch finger 68, 70 is made integral with each of the spindles 64 and 66 respectively. The two catch fingers 68 and 70 are positioned opposite each other and interconnected by a draw spring 72 whose axis is offset towards the interior of the slave arm with respect to the plane containing the spindles 64 and 66 so that they tend to make the blocking devices tilt towards the pinions 26a, 26b and 26c.

At its extremity, each catch finger 68 and 70 carries a stop 73 and 74 respectively. As clearly illustrated on FIG. 4, when the ball and socket joint 16 is secured to the extremity of the slave arm 10, these stops 73 and 74 rest on a projecting surface 76 formed on the box 16a of the ball and socket joint in such a way that all the blocking devices 60a, 60b, 60c, 62a, 62b and 62c are kept spaced apart from the pinions 26a, 26b and 26c, despite the action of the spring 72.

In this way, the different movements F1, F2 and F3 of the gripping pliers can be controlled normally when the ball and socket joint 16 is secured to the extremity of the slave arm.

On the other hand, as soon as the ball and socket joint 16 has been disconnected, the surface 76 is effaced so that the stops 73 and 74 no longer encounter any resistance. Under the action of the spring 72, the different blocking devices are then automatically driven against the tooth flanks of the pinions 26a to 26c in order to stop all movement of these pinions. An ill-timed displacement of the strips is thus impossible as long as the ball and socket joint has not been secured to the extremity of the slave arm. Thus, any risk of breakage of the strips resulting from this ill-timed displacement is eliminated.

In the example of embodiment showing the position where the gripping pliers is also secured in a dismountable way on the ball and socket joint 16, the problem previously referred to also risks occurring as regards the strip 20 which controls the tightening movement of the pliers when the latter are dismounted. In fact, the mechanical stops limiting this tightening movement are directly situated on the pliers.

In order to also eliminate any risk of breakage of the strips 20 in the case where the pliers 18 are dismountable, the device illustrated on the figures also makes it possible to lock the rotating shaft 40 controlling the tightening movement of the pliers when the latter is dismounted.

More precisely and as shown on FIGS. 2 and 3, a ring 78 is inserted to this effect between the rotating shaft 40 and the tubular part 38 at the extremity of the latter. This ring 78 is drilled with an oblong hole 80 orientated parallel to its axis and which is penetrated by a key 82. This key immobilizes the ring 78 in rotation inside the tubular part 38, whilst enabling the ring to move parallel to its axis between a rear position shown by the full lines on the left half of FIG. 3 and a front position represented by the full lines on the right half of this figure.

A compression spring 84 is housed in a space formed between the ring 78 and the shaft 40. This spring takes support by one of its extremities on a collar 86 formed on the shaft 40 and by its opposite extremity on a shoulder formed on the ring 78. The spring 84 thus tends to move the ring 78 towards a front position.

The ring 78 includes a portion projecting beyond the extremity of the tubular part 38, this projecting portion forming an internal crown fitted with grooves 88 in addition to the grooves 50. In the front position of the ring, the grooves 88 are engaged with the grooves 50. On the other hand, when the ring 78 is in the rear position, the grooves 88 are opposite an annular groove 90 formed on the shaft 40 in the prolongation of the grooves 50.

When the gripping pliers 18 are secured to the ball and socket joint 16, the extremity surface 52a of the part 52 rests on the extremity of the part projecting from the ring 78 so as to force the latter back into its rear position represented by the full lines on the left half of FIG. 3. In this position, given the fact that the grooves 88 are situated at the level of the recess 90 of the shaft 40, the latter can rotate freely so as to transmit to the pliers a gripping movement controlled by the operator, even if the ring 78 is immobilized in rotation by the key 82.

On the other hand, when the gripping pliers 18 are dismantled, the spring 84 forces the ring 78 back to its front position, as shown on the right half of FIG. 3. In these conditions, the grooves 88 are engaged with the grooves 50 of the shaft 40 so that the latter is automatically rotation immobilized as soon as the pliers are dismantled. Any movement of the strip 20 used to control the tightening movement of the pliers is therefore impossible. Owing to this, any risks of said strip breaking on reaching the end of travel are eliminated.

By way of example by no means restrictive, the figures represent also a mechanism allowing for the ball and socket joint to be secured in a dismountable manner to the slave arm 10 and a mechanism allowing for the gripping pliers 18 to be secured in a dismountable manner to the ball and socket joint 16.

As shown on FIG. 4, the first of these mechanisms include two hooks 92 secured to the body 10a of the slave arm so that they come and partly surround a cylindrical rod 94 mounted parallel to the spindles 20 and 34 inside the box 16a of the ball and joint socket. Locking of the link is carried automatically by means of a tilting lever 96 mounted pivoting around a spindle 98 parallel to the rod 94 inside the ball and socket joint box. A spring 100 activates this lever 96 so as to engage one hook-shaped extremity 102 of this lever inside a hole formed intended for this effect in the body 10a of the slave arm. Unlocking is easily obtained by pressing on the lever extremity 96 which is opposite the hook-shaped extremity 102 so as to disengage the latter from the hole formed in the body 10a. The hook 92 can then be freed from the rod 94.

A mechanism enabling the pliers 18 to be secured in a dismountable way to the ball and socket 16 is shown on FIGS. 3, 4 and 6. This mechanism comprises mainly two jaws articulated onto the tubular portion 18a of the body of the pliers by two spindles 106 parallel to the axis of this cylindrical portion. These jaws 104 are housed inside suitable apertures formed in the tubular portion 18a so that they can be made to project inside the latter and come and be housed inside the diametrically opposite right grooves 108 formed at the exterior surface of the tubular joining piece 48.

A torsional spring 110 borne by the tubular part 18a of the pliers body simultaneously acts upon the two jaws 104 to make them pivot around their own axes 106 in the direction tending to make these jaws penetrate the grooves 108. In this way, when the tubular part 18a of the pliers body is pressed onto the jointing piece 48 of the ball and socket joint, the jaws come and automatically nest inside the grooves 108, thus rendering rotation and translation integral the pliers body of the joining piece 48.

As shown in FIG. 6, whenever the pliers 18 need to be dismantled, the jaws 104 are made to pivot in the opposite direction by means of a tool 112, one portion of which only is shown on the figure. This tool 112 comes into contact with the portions of the jaw 104 projecting outside the cylindrical portion 18a of the pliers body. Thus, it is possible to control the desired tilting of the jaws by means of the tool.

Of course, the invention applies also to the case of a telescopic remote handling device, irrespective of the number of strips used for controlling the movements of the pliers.

I claim:

1. A device for the automatic locking of mechanisms controlling the various movements (F1, F2, F3) of a pair of gripping pliers (18) borne by a ball and socket joint (16) secured in a dismountable way to the extremity of a slave arm (10, 14) of a remote handling device during dismounting of the ball and socket joint, these mechanisms comprising a first series of pinions (26a, 26b, 26c) housed in the extremity of the slave arm and a second series of pinions (30a, 30b, 30c) mounted inside the ball and socket joint so as to be geared onto the pinions of the first series when the ball and socket joint (16) is secured to the extremity of the slave arm, wherein said device comprises mobile blocking devices (60a, 60b, 60c) housed inside the extremity of the slave arm, elastic means (72) tending to apply these blocking devices against the pinions (26a, 26b, 26c) of the first series, and at least one stop (73, 74) integral with the blocking devices so as to free the latter from the pinions of the first series under the effect of the stop coming to rest against an opposite surface (76) formed on the ball and socket joint when the latter is secured to the extremity of the slave arm.

2. Device according to claim 1, wherein said device comprises two series (60a, 60b, 60c; 62a, 62b, 62c) of blocking devices, one blocking device of each series coming to be applied against opposite flanks of teeth of each pinion (26a, 26b, 26c) of the first series of pinions under the effect of the elastic means (72) so as to stop these pinions from rotating when the ball and socket joint is being dismounted.

3. A device according to claim 2, wherein the blocking devices of each series are secured onto common axes, respectively (64, 66), a stop (73, 74) being secured to each said axis.

4. A device according to claim 3, wherein the axes (64, 66) bearing the blocking devices of each series are approximately disposed on both sides of the pinions (20a, 20b, 20c) of the first series of pinions, the blocking devices having the shape of ratchet gears oriented towards these pinions and applied against the latter by at least one draw spring (72) inserted between the two series of blocking devices and forming said elastic means.

5. A device according to any of claims 1 to 4, wherein the pair of gripping pliers (18) being also secured in a dismountable way to the ball and socket joint (16) and said mechanisms comprising in addition a rotating shaft (40) for controlling tightening of the pliers, housed inside a tubular part (38) non-rotating with respect to the ball and socket joint and whose portion projecting from this part is fitted with grooves (50), said portion provided with grooves being received inside a grooved hole (56) formed inside a part (52) for controlling tightening of the pliers when the latter is secured to the ball and socket joint, the locking device moreover comprising a ring (78) inserted between the tubular part (38) and the rotating shaft (40), means (80, 82) to prevent ring rotation inside the tubular part and allow for limited displacement of the ring along an axis common to the rotating shaft, the tubular part and the ring between a front position where the ring is geared onto the grooves (50) of said portion and a rear position where the ring is freed from said grooves, elastic means (84) tending to move the ring towards said front position, and an area of support (52a) formed on the tightening control part (52a), this area of support maintaining said ring (78) in its rear position when the pliers are secured to the ball and socket joint.

6. A device according to claim 5, wherein the ring (58) has an oblong hole (80) orientated parallel to said axis inside which a key (82) is received preventing ring rotation inside the tubular part (38) and allowing for its displacement between said front and rear positions.

7. Device according to claim 5, wherein the ring (78) comprises an interior grooved crown (88), this crown being geared on the grooves (50) when the ring is in its front position and positioned opposite an annular recess (90) prolonging the grooves when the ring is in its rear position.

8. Device according to any one of claims 1 to 4, wherein each pinion (26a, 26b, 26c) of the first series of pinions is integral with one double pulley (22a, 22b, 22c) comprising two pulleys on which wound in an opposite direction are two strips (20) whose extremities are secured to these two pulleys.

* * * * *